United States Patent Office 3,324,142
Patented June 6, 1967

---

3,324,142
1,9-PYRAZOLE-ANTHRONES
Rütger Neeff, Leverkusen, Germany, assignor to Farbenfabriken Bayer Aktiengesellschaft, Leverkusen, Germany, a corporation of Germany
No Drawing. Filed Oct. 1, 1963, Ser. No. 312,869
Claims priority, application Germany, Oct. 6, 1962, F 37,984
2 Claims. (Cl. 260—312)

This invention relates to novel anthraquinone dyestuffs, their preparation and application.

It has been found that 5-halopropionylamino-1,9-pyrazoleanthrones exhibit particularly good properties as dyestuffs, especially for materials from polyesters, and that they can be obtained by acylating 5-amino-1,9-pyrazoleanthrone with reactive derivatives of halopropionic acids, when the 5-halopropionylamino-N'-halopropionyl-1,9-pyrazoleanthrones which are formed first of all are partially hydrolyzed to give the 5-halopropionylamino-1,9-pyrazoleanthrones.

By way of reactive derivatives of halopropionic acids, use is preferably made of the acid halides or acid anhydrides of 1-chloro- or 1-bromo-propionic acid, 2-chloro- or 2-bromopropionic acid, and also of 1,2-dichloro- or 1,2-dibromo-propionic acid. Acylation is carried out by methods known per se, in an inert solvent such as chlorobenzene or nitrobenzene, optionally in the presence of acid binding agents such as pyridine or dimethylaniline, and preferably at an elevated temperature.

The partial hydrolysis of the 5-halopropionylamino-N'-halopropionyl-1,9-pyrazole-anthrones can for instance be effected simply by stirring with concentrated sulfuric acid at about 0° C.

The dyestuffs employed according to the invention are particularly useful for dyeing polyester materials especially linear aromatic polyesters such as polyethylene glycol-terephthalate fibres to transparent greenish yellow shades with excellent fastness to washing and to light, and with outstanding fastness to sublimation.

The following example is given for the purpose of illustrating the invention. The term "parts" denotes parts by weight.

Example 100 parts of 5-amino-1,9-pyrazole-anthrone in 800 parts of chlorobenzene are slowly treated at 100–110° C. with a mixture of 130 parts of β-chloropropionic acid chloride and 150 parts of chlorobenzene, and stirred until the formation of yellow needles has been completed. After cooling, the resultant dyestuff of the formula

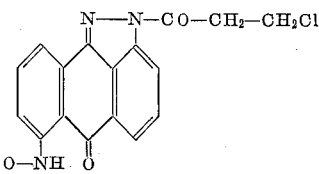

is filtered off with suction, and it is freed from solvent as usual.

70 parts of the resultant product are stirred at 0° C. with 650 parts of concentrated sulfuric acid for about one hour. The resultant dyestuff of the formula

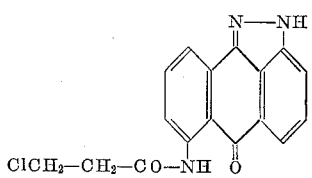

is precipitated by pouring onto ice, and the product which thereby separates in a finely divided form can be directly employed for compounding.

A dye liquor is prepared which contains a dispersion of one part of the above dyestuff and 20 parts of cresotinic acid methyl ester in 4000 parts of water and which is adjusted to a pH value of 4.5 with sulfuric acid. 100 parts of polyethylene glycol-terephthalate fibres are introduced into the dye liquor at 50° C., it is heated up to 100° C. within 20–30 minutes, and left at this temperature for 1½ hours. After rinsing and drying the fibres, a transparent greenish-yellow dyeing is obtained which is characterized by very good fastness to washing, high resistance to light, and excellent fastness to sublimation.

When the dyeing operation is carried out at 125° C. for 1 to 1½ hours in the absence of cresotinic acid methyl ester, a transparent greenish-yellow dyeing with similar fastness properties is again obtained.

I claim:
1. 5-halopropionylamino-1,9-pyrazole-anthrone.
2. 5-β-chloropropionylamino-1,9-pyrazole-anthrone.

References Cited

UNITED STATES PATENTS

| | | | |
|---|---|---|---|
| 1,781,248 | 11/1930 | Scheyer | 260—312 |
| 2,123,246 | 7/1938 | Koeberle et al. | 260—312 |
| 2,133,432 | 10/1938 | Deinet | 260—312 |
| 2,136,133 | 11/1938 | Hauser et al. | 260—312 |
| 2,715,128 | 8/1955 | Grossmann et al. | 260—312 |
| 2,817,667 | 12/1957 | Schmidt-Nickels et al. | 260—312 |
| 2,892,670 | 6/1959 | Alsberg et al. | 8—39 |
| 3,100,132 | 8/1963 | Jenny et al. | 8—39 |

OTHER REFERENCES

Conant et al., The Chemistry of Organic Compounds, 3rd ed., p. 179, N.Y., MacMillan, 1947.

Duffy et al., Jour. Chem. Soc. (London), 1960, pages 853–9.

Noller, Chemistry of Organic Compounds, 2nd ed., page 246, Philadelphia, Saunders, 1958.

WALTER A. MODANCE, *Primary Examiner.*

NICHOLAS S. RIZZO, NATALIE TROUSOF,
*Assistant Examiners.*